Oct. 27, 1936.   J. A. JEFFERSON   2,058,590
COMBINATION SHUT-OFF AND CHECK VALVE
Filed July 10, 1934   3 Sheets-Sheet 1

Inventor=
John A. Jefferson
By Arthur F. Randall
Atty.

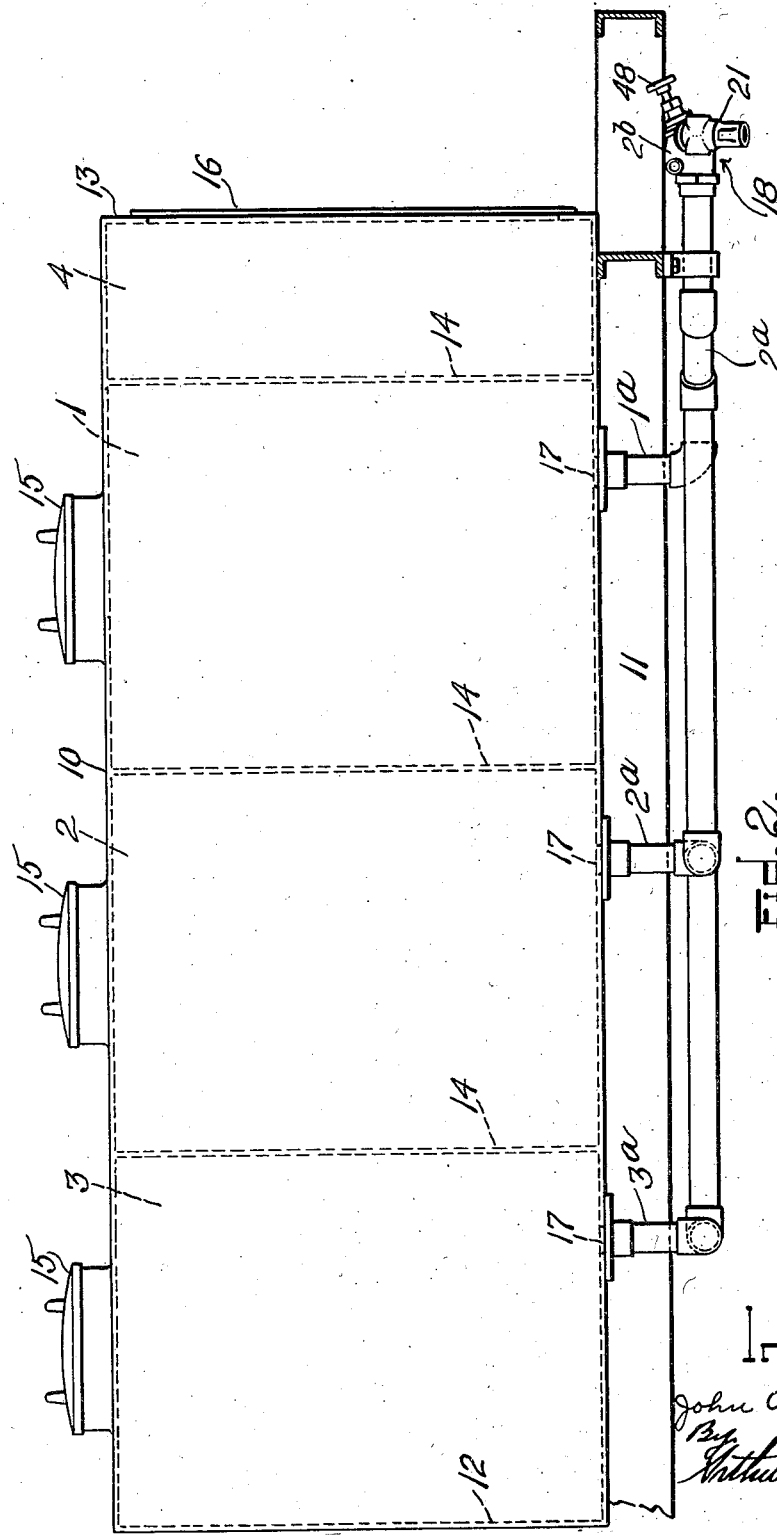

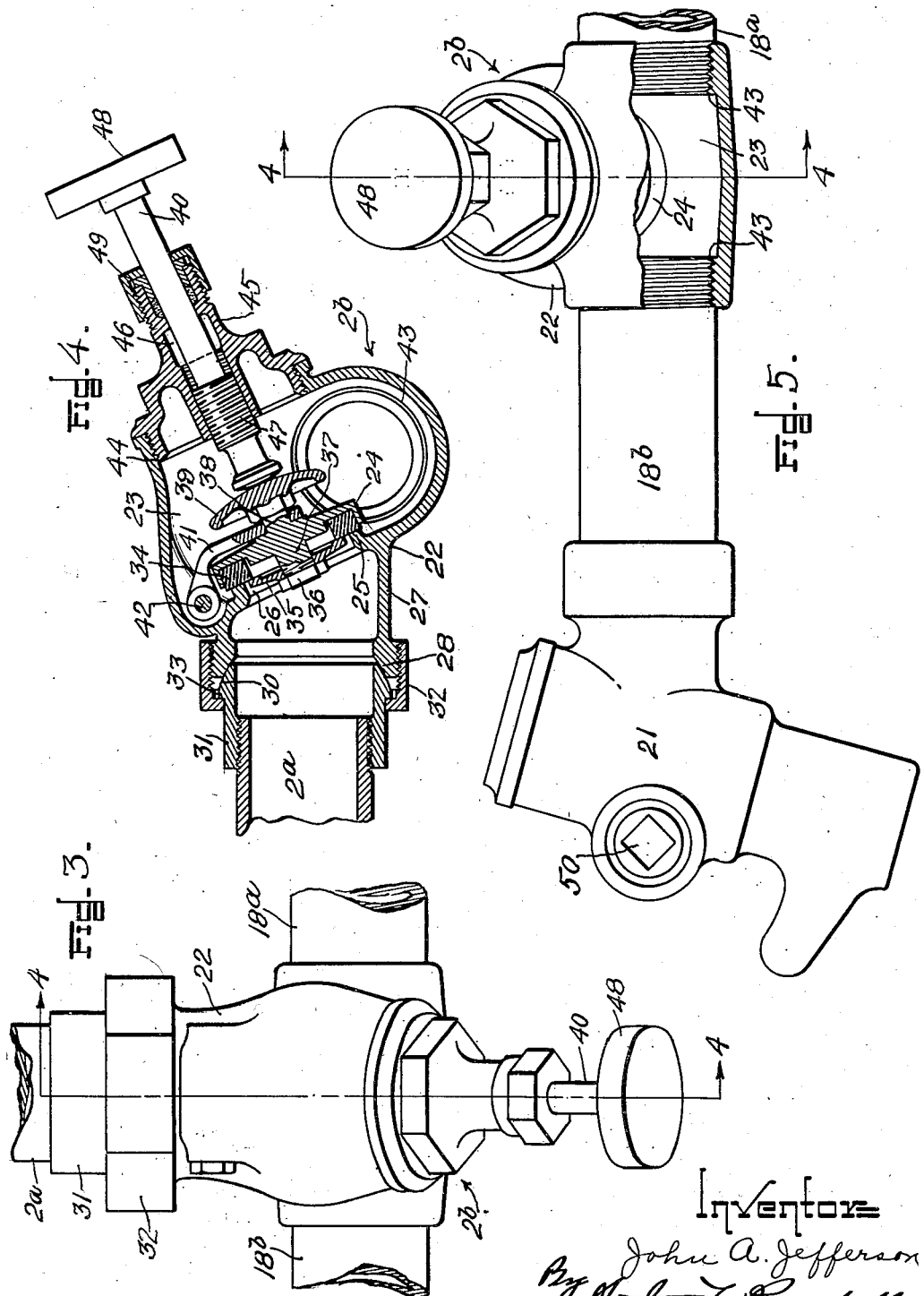

Patented Oct. 27, 1936

2,058,590

UNITED STATES PATENT OFFICE 2,058,590

COMBINATION SHUT-OFF AND CHECK VALVE

John A. Jefferson, Belmont, Mass.

Application July 10, 1934, Serial No. 734,526

3 Claims. (Cl. 251—125)

My invention relates to a valve pipe-fitting for tank vehicles such as are used in transporting and dispensing liquids, particularly fuel oils, and it has for its object to provide an improved valve for incorporation therein.

Vehicles of the class referred to include motor propelled tank wagons such as are in common use at the present time, each of which is constructed with a body consisting of an elongate horizontal longitudinally disposed sheet metal tank that is interiorly divided into a plurality of liquid holding compartments by a number of transversely arranged partitions. Each of these compartments is provided at its bottom with an outlet with which is connected a separate delivery pipe conduit extending longitudinally to the rear end of the vehicle. At the rear end of the vehicle the several delivery conduits are usually connected with a transversely disposed manifold whereof one end is connected by an off-take pipe conduit with the inlet of a motor driven delivery pump, and whose opposite end is commonly provided with a normally closed draw-off faucet from which metered deliveries may be made.

It is also common practice to provide a normally closed manually operable shut-off valve in each delivery conduit between its compartment and said manifold, and adjacent to the latter, so that the contents of each compartment can be drawn off and delivered separately and independently of the contents of the other compartments.

Each delivery conduit has heretofore been provided with an independent manually operable and normally closed shut-off valve as set forth so that the contents of either compartment could be drawn off either in whole or in part independently and to the exclusion of the other compartments but this could be accomplished only so long as the said shut-off valves were properly manipulated by the operator during each delivery operation.

If the operator neglected to close a shut-off valve after making a partial delivery from the compartment of that valve, then while later making another delivery from a second compartment the first and second compartments would be in communication through their two delivery conduits and the manifold with the result that while making the second delivery oil would flow from one compartment into the other because of difference in the levels of the two bodies of liquid within said compartments. This was highly objectionable, particularly when the contents of one of those compartments was oil of one kind and the contents of the other oil of another kind.

Another objectionable feature characterizing vehicles of this class as heretofore constructed has been that a dishonest operator could leave the shut-off valve of an empty compartment open for a time while making delivery from another compartment with the result that some oil would be diverted into the empty compartment where it could be trapped and held by closing the shut-off valve of that compartment before completion of the delivery operation, said trapped oil being later disposed of by the operator to his own personal benefit and loss to the customer. The Sealer of Weights and Measures of at least one State has made it essential to approval that vehicles of this type be so constructed as to make it impossible for a dishonest operator to deliver short measure in this fashion.

My invention has for its main object to obviate the above noted objectionable features characterizing tank wagons of the class referred to.

To these ends I have provided an improved valve pipe-fitting for liquid dispensing vehicles, said fitting having the peculiar features of construction and operation set forth in the following description, the several novel features of the invention being separately pointed out and defined in the claims at the close thereof.

In the accompanying drawings:—

Figure 2 is a side elevation, partly in section, of the structure illustrated in Fig. 1.

Figure 3 is a top plan view of my new combination check and stop valve fitting.

Figure 4 is a section on line 4—4 of Figs. 3 and 5.

Figure 5 is a rear elevation of an end portion of the manifold hereinafter described.

Figure 1:
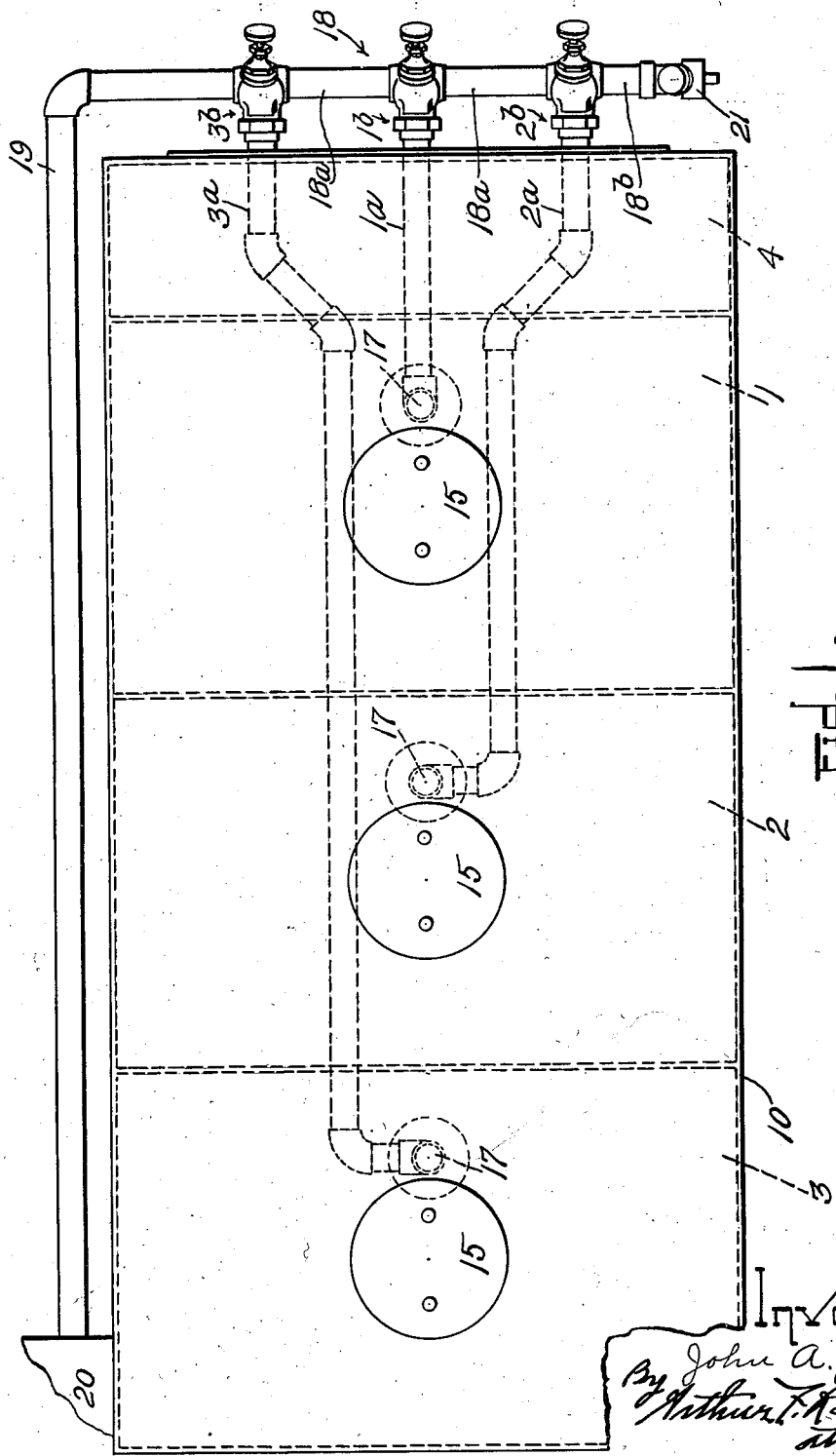
Figure 1 is a top plan view of a tank wagon equipped with valve fittings constructed in accordance with my invention.

The illustrated vehicle for use in dispensing liquids comprises a sheet metal tank body 10 mounted upon a channel-iron frame 11 which, in turn, may be mounted upon springs, not shown, carried by the chassis of the vehicle. The latter may be motor propelled as usual.

The tank body 10 is made with a front end wall 12, a rear end wall 13, and several intermediate transverse partition walls 14 which divide the interior thereof into three oil-holding compartments 1, 2, and 3 and a storage compartment 4 for holding the usual measuring cans, not shown.

The top of each compartment 1, 2, and 3 is constructed, as usual, with a dome provided with a removable cover or closure 15 while the rear wall 13 is made, as usual, with a doorway provided with a door 16 affording access to the measuring cans, not shown, within compartment 4.

Each compartment 1, 2, and 3 is made at its bottom with an outlet 17, the outlet 17 of compartment 1 being connected with a transversely disposed manifold 18 at the rear end of the vehicle by a delivery pipe conduit 1a; the outlet 17 of compartment 2 being connected with said manifold by a pipe conduit 1b, and the outlet 17 of compartment 3 being connected with said manifold by a pipe conduit 1c.

The manifold 18, as herein constructed, comprises three combination check-and-stop valve fittings 1b, 2b and 3b disposed in spaced apart relationship and connected by two pipe sections 18a. The valve fitting 3b adjacent to one side of the vehicle also has connected with it one end of an off-take pipe conduit 19 whose opposite end is connected with the inlet of the usual motor-driven pump 20, while the valve fitting 2b adjacent to the opposite side of the vehicle is connected by a pipe section 18b with a draw-off faucet 21 from which delivery may be made directly into a measuring can, or through the usual metering hose, not shown, that is attachable to the outlet of said faucet.

The three combination check-and-stop valve units 1b, 2b and 3b are all of like construction and each comprises a hollow "cross" pipe fitting body 22, Figs. 3, 4, and 5, whose interior provides a central valve chamber 23 within which is arranged a check valve 24 adapted to close against a seat 25 surrounding an inlet port 26. This port 26 extends through an exteriorly threaded nipple 27 that is part of the valve body 22.

The outer end portion of nipple 27 is interiorly formed with a parti-spherical concaved seat 28 for a complemental parti-spherical convex end portion 30 provided upon the exterior of a coupling nipple 31. The nipple extension 27 of the valve body 22 is exteriorly threaded to receive upon it an interiorly threaded ring coupling member 32 which, together with the two nipples 27 and 31 provide a union by means of which the valve fitting is connected with one end of its delivery pipe conduit.

The nipple 31 is interiorly threaded at one end thereof to receive the exteriorly threaded end portion of the delivery pipe conduit, and exteriorly formed with an annular radial shoulder 33 to abut a complemental shoulder provided upon the interior of ring member 32 whereby the latter clamps the end of nipple 31 against the seat 28 on body 22.

The check valve 24 is constructed with a circular cup-like body within which is an annulus 34 made from a non-metallic composition, said annulus being provided for engagement with the seat 25 on body 22. This annulus 34 is securely clamped within the cup-shaped body of the check valve by means of a washer 35 and nut 36, the latter being mounted upon a threaded stem 37 projecting from the front side or face of said body.

Projecting from the opposite rear side or face of the cup-shaped body of the check valve 24 is another stem 38 provided at its upper end with a flanged head 39 having a convex top side for engagement with the inner end of an adjustable valve-locking member 40.

Between the head 39 and the cup-like body of the check valve 24 the stem 38 has loosely mounted thereon one end of a valve-supporting arm 41, said end being formed with an aperture through which the stem 38 extends loosely so that the valve 24 can rock universally to a limited extent relatively to arm 41 and fit itself to the seat 25 when it is closed.

The opposite end of arm 41 is pivotally connected with the fitting body 22 by means of a pintle 42 so that when locking member 40 is disengaged from head 39 the check valve 24 is free to swing toward and from seat 25.

At the opposite sides of the valve chamber 23 the fitting body 22 is made with interiorly threaded ports 43 each adapted to receive within it the exteriorly threaded end of one of the pipe sections 18a and 18b of the manifold, the axes of said ports being relatively alined perpendicularly with respect to the axis of port 26 and off-set downwardly relatively thereto so that the flow of oil from one of said pipe sections through chamber 23 to the other pipe section is not impeded by valve 24.

Upon the side of chamber 23 opposite the port 26 the fitting body 22 is made with a circular interiorly threaded port or aperture 44 into which is screwed the exteriorly threaded skirt of a cap 45 having a centrally disposed hole 46 extending therethrough within which the locking member 40 is rotatably mounted. The locking member 40 is herein shown as a spindle having an intermediate threaded portion 47 in engagement with the interiorly threaded inner end portion of the hole 46 so that when the locking member is rotated in one direction its inner end may be forced against the head 39 of the check valve thereby to lock the latter in its closed position, and when rotated in the opposite direction its inner end may be retracted sufficiently to permit the check valve to open and close.

Locking member 40 is manually operated and therefor is provided at its outer end with a hand wheel 48.

Leakage of oil from chamber 23 through the hole 46 is prevented by a stuffing box 49 provided at the outer end of said hole.

It will be clear from the above description that the check valves 24 of the delivery pipe conduits 1a, 2a, and 3a will function at all times to prevent oil from flowing from one compartment into another compartment so that it is impossible for a dishonest operator to deliver short measure to a customer, or for the different oils to be mixed.

In making a delivery the operator unscrews the locking member 40 of the compartment from which it is desired to make the delivery and then when pump 20 is set in operation the oil is moved from said compartment through the offtake conduit 19 and pump 20 to the customer's receiving vessel or container. Or if the delivery is to be made through the usual metering hose, not shown, then the latter is attached to the faucet 21 and when the locking member 40 of the compartment through which the delivery is to be made is retracted the oil will flow from that compartment through the delivery pipe conduit thereof into manifold 18 and thence through faucet 21 and the metering hose into the customer's receiving vessel by gravity. As shown in Fig. 5, the faucet 21 may be provided with a valve 50 operable to open and close said faucet and of course, while making a delivery through the metering hose, this valve 50 occupies its open position.

The check valve 24 closes by gravity toward its seat 25 and in combination with the locking member 40 also serves the purpose of a stop or shut-off valve which can be positively locked in its normally closed position by means of said locking member 40. In this way the valve 24 serves a double purpose.

What I claim is:

1. As a new article of manufacture, a stop and check valve of the class described for use as an intermediate section of the delivery manifold of a tank truck, said valve comprising a cross body formed with a valve chamber having an inlet port and two side ports and with a valve seat within said chamber surrounding the inner end of said inlet port, said side ports being relatively alined at opposite sides of and perpendicularly with respect to the axis of said inlet port and also offset laterally relatively to the latter so as to provide between them a straight unobstructed passageway through said chamber; means on said body for connecting a separate pipe section with each of said three ports; a check valve within said chamber co-operatively associated with said seat so that it is disposed outside of said passageway when occupying its closed position and also when occupying its open position; means within said chamber but outside of said passageway through which said check valve is pivotally supported by said body so as to swing bodily on an axis alongside of and parallel with said passageway thereby to control said inlet port, and a manually operable abutment spindle extending into said chamber through a hole formed in a wall of the latter opposite said inlet port and having threaded engagement with said wall so that when rotated it is moved endwise toward and from said check valve to occupy a position where it locks said check valve closed and also another retracted position where said check valve is free to swing toward and from said seat.

2. As a new article of manufacture, a pipe fitting of the class described constructed in accordance with claim 1 and wherein said check valve is made upon its rear side with a stem and said valve supporting means comprises an arm pivotally connected at its one end to said cross body and having its opposite end made with an aperture within which said stem is loosely confined so that said valve is free to rock independently and universally to a limited extent thereby to fit itself to said seat, said arm being also disposed outside of said passageway.

3. As a new article of manufacture a check-and-stop valve unit section of a manifold of the character described, said unit section comprising a cross body formed with a central valve chamber having an inlet port surrounded by a valve seat, an opening in a wall of said body that is opposite said inlet port, and two side ports which are relatively alined axially at opposite sides of and perpendicular with respect to the axes of said inlet port and opening and also laterally offset with respect to the axes of said inlet port and said opening so as to provide a straight unobstructed passageway through said body from one side port to the opposite side port; means on said body for connecting a separate conduit section with each of said three ports; a check valve within said chamber made with a headed stem projecting from its rear side; an arm pivotally mounted within said chamber made with an aperture within which said stem is loosely confined by the head thereof so as to permit said valve to adjust itself universally to said seat when occupying its closed position, said arm supporting said valve so that it is outside of said passageway when said valve occupies its open and closed position; a cap secured to said body and closing said opening, said cap being made with a threaded aperture, and an abutment spindle occupying said aperture and having a threaded portion engaging the threads of said aperture so that when said spindle is rotated it is moved endwise toward and from the rear side of said check valve to occupy either a projected position where it abuts said stem to lock the check valve closed or another retracted position where it is out of engagement with said stem and the check valve is free to swing independently with said arm, said spindle being provided upon the exterior of said body with a handle by means of which it is manually operated.

JOHN A. JEFFERSON.